(12) United States Patent
Kwon et al.

(10) Patent No.: US 11,854,252 B1
(45) Date of Patent: Dec. 26, 2023

(54) AUTOMATED PROBABILISTIC AXIOM GENERATION AND INCREMENTAL UPDATES

(71) Applicant: HRL Laboratories, LLC, Malibu, CA (US)

(72) Inventors: Hyukseong Kwon, Thousand Oaks, CA (US); Amit Agarwal, San Francisco, CA (US); Amir M. Rahimi, Santa Monica, CA (US); Kevin Lee, Irvine, CA (US); Alexie Pogue, Los Angeles, CA (US); Rajan Bhattacharyya, Sherman Oaks, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 0 days.

(21) Appl. No.: 17/700,802

(22) Filed: Mar. 22, 2022

Related U.S. Application Data

(63) Continuation-in-part of application No. 17/133,345, filed on Dec. 23, 2020, now Pat. No. 11,350,039, (Continued)

(51) Int. Cl.
*G06K 9/62* (2022.01)
*G06V 10/98* (2022.01)
(Continued)

(52) U.S. Cl.
CPC ............ *G06V 10/993* (2022.01); *G06V 10/10* (2022.01); *G06V 10/763* (2022.01); *G06V 10/764* (2022.01); *G06V 20/56* (2022.01)

(58) Field of Classification Search
CPC .... G06V 10/993; G06V 10/10; G06V 10/763; G06V 10/764; G06V 20/56
See application file for complete search history.

(56) References Cited

U.S. PATENT DOCUMENTS

| 8,027,946 | B1 | 9/2011 | Daily |
| 9,008,840 | B1 | 4/2015 | Ponulak |

(Continued)

OTHER PUBLICATIONS

Dokhanchi, H.B. Amor, J.V. Deshmukh, and G. Fainekos, "Evaluating Perception Systems for Autonomous Vehicles Using Quality Temporal Logic," International Conference on Runtime Verification, 2018, pp. 409-416.

(Continued)

*Primary Examiner* — Howard D Brown, Jr.
(74) *Attorney, Agent, or Firm* — TOPE-MCKAY & ASSOCIATES

(57) ABSTRACT

Described is a system for evaluating and correcting perception errors in object detection and recognition. The system receives perception data from an environment proximate a mobile platform. Perception probes are generated from the perception data which describe perception characteristics of object detections in the perception data. For each perception probe, probabilistic distributions for true positive and false positive values are determined, resulting in true positive and false negative perception probes. Statistical characteristics of true positive perception probes and false positive perception probes are then determined. Based on the statistical characteristics, true positive perception probes are clustered. An axiom is generated to determine statistical constraints for perception validity for each perception probe cluster. The axiom is evaluated to classify the perception probes as valid or erroneous. Optimal perception parameters are generated by solving an optimization problem based on the axiom. The perception module is adjusted based on the optimal perception parameters.

15 Claims, 13 Drawing Sheets

Related U.S. Application Data which is a continuation-in-part of application No. 17/030,354, filed on Sep. 23, 2020, now Pat. No. 11,334,767, application No. 17/700,802 is a continuation-in-part of application No. 17/030,354, filed on Sep. 23, 2020, now Pat. No. 11,334,767.

(60) Provisional application No. 63/188,364, filed on May 13, 2021, provisional application No. 62/984,713, filed on Mar. 3, 2020, provisional application No. 62/905,059, filed on Sep. 24, 2019.

(51) Int. Cl.
    *G06V 20/56* (2022.01)
    *G06V 10/762* (2022.01)
    *G06V 10/764* (2022.01)
    *G06V 10/10* (2022.01)

(56) References Cited

U.S. PATENT DOCUMENTS

| | | | |
|---|---|---|---|
| 9,626,591 | B2 | 4/2017 | Holz et al. |
| 10,699,419 | B2 | 6/2020 | Cui |
| 2011/0051992 | A1 | 3/2011 | Cobb |
| 2012/0188365 | A1 | 7/2012 | Stork |
| 2015/0378696 | A1 | 12/2015 | Boehm |
| 2016/0165193 | A1 | 6/2016 | Rasheed |
| 2017/0364831 | A1 | 12/2017 | Ghosh |
| 2018/0005118 | A1 | 1/2018 | Kapoor |
| 2019/0302439 | A1 | 10/2019 | Lyuboshenko |
| 2020/0036743 | A1 | 1/2020 | Almukaynizi |
| 2020/0111005 | A1* | 4/2020 | Ghosh .......... G06N 3/042 |
| 2020/0111012 | A1 | 4/2020 | Wan |
| 2020/0221009 | A1 | 7/2020 | Citerin |
| 2021/0011461 | A1 | 1/2021 | Fowler |
| 2021/0081751 | A1 | 3/2021 | Boss |
| 2021/0089837 | A1* | 3/2021 | Kwon .......... G06V 10/42 |

OTHER PUBLICATIONS

J. Redmon and A. Farhadi, "YOLOv3: An Incremental Improvement," arXiv:1804.02767, 2018, pp. 1-6.

"Bhattacharyya Distance," https://encyclopediaofmath.org/wiki/Bhattacharyya_distance/ Taken on May 24, 2021, pp. 1-2.

"Mahanlanobis Distance: Simple Definition, Examples," https://www.statisticshowto.com/mahalanobis-distance/ Taken on May 24, 2021, pp. 1-4.

"Welcome to MOTChallenge: The Multiple Object Tracking Benchmark!", https://motchallenge.net Taken on May 24, 2021, pp. 1-2.

A. Dokhanchi, H. B. Amor, J.V. Deshmukh, and G. Fainekos, "Evaluating perception systems for autonomous vehicles using quality temporal logic," International Conference on Runtime Verification, pp. 409-416, 2018.

R.R. da Silva, V. Kurtz, and M. Hebert, "Active Perception and Control from Temporal Logic Specifications," arXiv:1905.03662, pp. 1-6, 2019.

S. Jha, V. Raman, D. Sadigh, and S.A. Seshia, "Safe Autonomy Under Perception Uncertainty Using Chance- Constrained Temporal Logic," Journal of Automated Reasoning, pp. 43-62, 2018.

D. Sadigh and A. Kapoor, "Safe control under uncertainty with Probabilistic Signal Temporal Logic, " in Proc. Of Robotics: Science and Systems, pp. 1-10, 2016.

J. A. Stark, "Adaptive Image Contrast Enhancement Using Generalizations of Histogram Equalization," IEEE Transactions on Image Processing, vol. 9, No. 5, pp. 889-896, 2000.

V. Vonikakis, D. Chrysostomou, R. Kouskouridas and A. Gasteratos, "Improving the Robustness in Feature Detection by Local Contrast Enhancement, " 2012 IEEE International Conference on Image Systems and Techniques Proceedings, pp. 1-6, Jul. 2012.

YOLO Real Time Object Detection, located at pjreddie.com/darknet/yolo/, pp. 1-7, taken on Aug. 12, 2020.

Luminance Contrast, found at colorusage .arc. nasa .gov/luminance_cont.php, pp. 1-7, taken on Dec. 2, 2020.

Multiple Object Tracking Benchmark, located at motchallenge.net, pp. 1-3, taken on Aug. 12, 2020.

Information Entropy Measure for Evaluation of Image Quality, Du-Yih Tsai, Yongbum Lee, Eri Matsuyama, J Digit Imaging. Sep. 2008; 21(3): pp. 338-347. Published online Jun. 19, 2007. doi: 10.1007/s10278-007-9044-5.

Notice of Allowance for U.S. Appl. No. 17/133,345, dated Feb. 7, 2022.

A. Dokhanchi, H. B. Amor, J.V. Deshmukh, and G. Fainekos, "Evaluating perception systems for autonomous vehicles using quality temporal logic," International Conference on Runtime Verification, 2018, pp. 1-7.

R.R. da Silva, V. Kurtz, and M. Hebert, "Active Perception and Control from Temporal Logic Specifications," arXiv:1905.03662, 2019, pp. 1-6.

S. Jha, V. Raman, D. Sadigh, and S.A. Seshia, "Safe Autonomy Under Perception Uncertainty Using Chance- Constrained Temporal Logic," Journal of Automated Reasoning, 2018, pp. 43-62.

D. Sadigh and A. Kapoor, "Safe control under uncertainty with Probabilistic Signal Temporal Logic," in Proc. Of Robotics: Science and Systems, 2016, pp. 1-10.

Joseph Redmon, Santosh Divvala, Ross Girshick, Ali Farhadi; The IEEE Conference on Computer Vision and Pattern Recognition (CVPR), 2016, pp. 779-788.

N. Wojke, A. Bewley and D. Paulus, "Simple online and realtime tracking with a deep association metric," 2017 IEEE International Conference on Image Processing (ICIP), Beijing, 2017, pp. 3645-3649.

YOLO: Real-Time Object Detection, https://pjreddie. com/darknet/yolo/ , downloaded Dec. 15, 2020.

Office Action 1 for U.S. Appl. No. 17/030,354, dated May 6, 2021.

Response to Office Action 1 for U.S. Appl. No. 17/030,354, dated Aug. 5, 2021.

Office Action 2 for U.S. Appl. No. 17/030,354, dated Sep. 8, 2021.

Response to Office Action 2 for U.S. Appl. No. 17/030,354, dated Dec. 8, 2021.

Notice of Allowance for U.S. Appl. No. 17/030,354, dated Jan. 25, 2022.

The International Search Report and The Written Opinion of the International Searching Authority for PCT/US2020/066972; dated Apr. 16, 2021.

Wu, Y., et al., "Active Control of Camera Parameters for Object Detection Algorithms," Ariv.org, Cornell University Library, NY, 2017, pp. 1-7.

Anand, B., et al., "Specifying and Evaluating Quality Mertics for Vision-based Perception Systems," 2019 Design, Automation & Test in Europe Conference & Exhibition, EDAA, pp. 1433-1438.

Erkan, T.C., et al., "Simulation-based Adversarial Test Generation for Autonomous Vehicles with Machine Learning Components," 2018 IEEE Intelligent Vehicles Symposium, pp. 1555-1562.

Notification of Transmittal and The International Preliminary Report On Patentability (Chapter II) for PCT/US2020/066972; dated Apr. 4, 2022.

Notification of Transmittal and The International Search Report, and the Written Opinion of the International Searching Authority for PCT/US2020/052342; dated Feb. 2, 2021.

Yulong Wu, et al., "Active Control of Camera Parameters for Object Detection Algorithms", Arxiv.org, Cornell University Library, 201. Olin Library Cornell University Ithaca, NY, 14853, May 16, 2017 (May 16, 2017), XP080948249.

Balakrishnan Anand, et al., "Specifying and Evaluating Quality Metrics for Vision-based Perception Systems", 2019 Design, Automation & Test in Europe Conference & Exhibition (Date), EDAA, Mar. 25, 2019 (Mar. 25, 2019), pp. 1433-1438, XP033550188.

Tuncali Cumhur Erkan, et al., "Simulation -based Adversarial Test Generation for Autonomous Vehicles with Machine Learning Components", 2018 IEEE Intelligent Vehicles Symposium (Iv), IEEE, Jun. 26, 2018 (2018-06-26), pp. 1555-1562, XP 033423320.

Notification of Transmittal of The International Preliminary Report On Patentability (Chapter I) for PCT/US2020/052342; dated Apr. 7, 2022.

(56) References Cited

OTHER PUBLICATIONS

The International Preliminary Report On Patentability (Chapter I) for PCT/US2020/052342; dated Apr. 7, 2022.

* cited by examiner

"Person" Detection

| | Confidence | Aspect ratio | Contrast | Entropy |
|---|---|---|---|---|
| Confidence | 1.0000 | -0.0479 | 0.1152 | 0.0836 |
| Aspect ratio | -0.0479 | 1.0000 | 0.0638 | -0.2752 |
| Contrast | 0.1152 | 0.0638 | 1.0000 | 0.3595 |
| Entropy | 0.0836 | -0.2752 | 0.3595 | 1.000 |

FIG. 7A

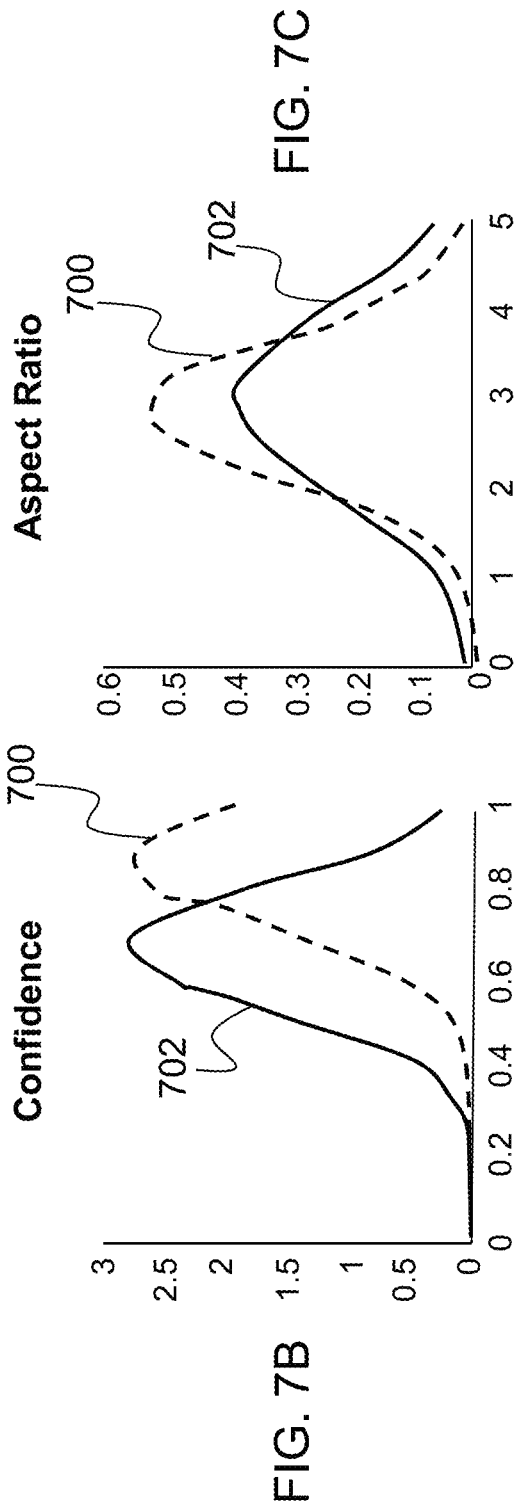
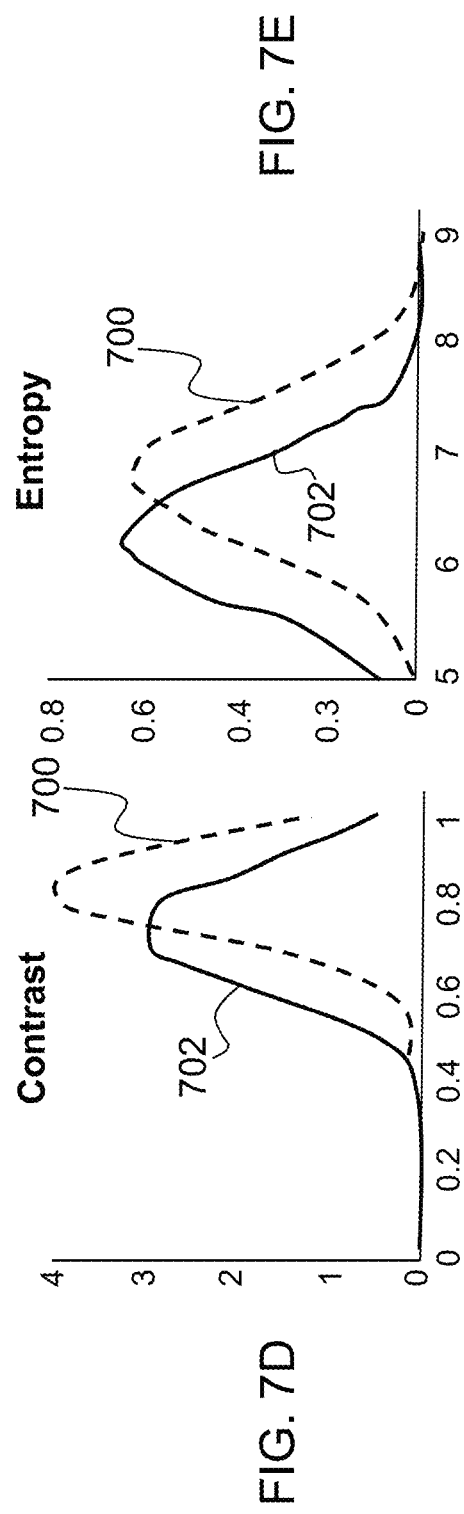

"Vehicle" Detection

| | Confidence | Aspect ratio | Contrast | Entropy |
|---|---|---|---|---|
| Confidence | 1.0000 | -0.1619 | 0.2622 | 0.2863 |
| Aspect ratio | -0.1619 | 1.0000 | 0.0054 | 0.1224 |
| Contrast | 0.2622 | 0.0054 | 1.0000 | 0.4084 |
| Entropy | 0.2863 | 0.1224 | 0.4084 | 1.000 |

FIG. 8A

"Bike" Detection

| | Confidence | Aspect ratio | Contrast | Entropy |
|---|---|---|---|---|
| Confidence | 1.0000 | 0.3149 | -0.4910 | -0.1507 |
| Aspect ratio | 0.3149 | 1.0000 | -0.3649 | -0.0866 |
| Contrast | -0.4910 | -0.3649 | 1.0000 | 0.6919 |
| Entropy | -0.1507 | -0.0866 | 0.6919 | 1.000 |

FIG. 9A

AUTOMATED PROBABILISTIC AXIOM GENERATION AND INCREMENTAL UPDATES

CROSS-REFERENCE TO RELATED APPLICATIONS

This is a Continuation-in-Part application of U.S. application Ser. No. 17/030,354, filed in the United States on Sep. 23, 2020, entitled, "System and Method of Perception Error Evaluation and Correction by Solving Optimization Problems Under the Probabilistic Signal Temporal Logic Based Constraints," which is a Non-Provisional application of U.S. Provisional Application No. 62/905,059, filed on Sep. 24, 2019 AND U.S. Provisional Application No. 62/984,713, filed on Mar. 3, 2020, the entirety of which are hereby incorporated by reference.

This is also a Continuation-in-Part application of U.S. application Ser. No. 17/133,345, filed in the United States on Dec. 23, 2020, entitled, "Contrast and Entropy Based Perception Adaptation Using Probabilistic Signal Temporal Logic Based Optimization," which is a Continuation-in-Part application of U.S. application Ser. No. 17/030,354, filed on Sep. 23, 2020, which is a Non-Provisional application of U.S. Provisional Application No. 62/905,059, filed on Sep. 24, 2019 AND U.S. Provisional Application No. 62/984,713, filed on Mar. 3, 2020, the entirety of which are hereby incorporated by reference. U.S. application Ser. No. 17/133,345 is also a Non-Provisional application of U.S. Provisional Application No. 62/984,713, filed on Mar. 3, 2020, the entirety of which are hereby incorporated by reference.

This is ALSO a Non-Provisional Application of U.S. Provisional Application No. 63/188,364, filed in the United States on May 13, 2021, entitled, "Automated Probabilistic Axiom Generation and Incremental Updates," the entirety of which is incorporated herein by reference.

BACKGROUND OF INVENTION

(1) Field of Invention

Aspects of the present invention relate to a system for object detection and recognition and, more specifically, to a system that operates to evaluate and correct perception errors in object detection and recognition.

(2) Description of Related Art

Perception errors are still a challenging issue despite significant performance improvements in perception systems in the last decade. In autonomous driving or navigation systems, a great number of wrong detections and recognitions threaten the safe and robust performance of fully autonomous systems. In order to detect perception errors and recover from them, there have been a number of research directions, especially with formally verifying the systems using temporal logic, as described in Literature Reference Nos. 1-4 of the List of Incorporated Literature References. However, most of these research systems control the autonomous systems (vehicle or unmanned aerial vehicle (UAV)) itself instead of fixing errors stemming from the perception systems.

To that end, a new approach was formulated to detect perception errors and adapt perception parameters using probabilistic signal temporal logic (PSTL) based optimization, as described in U.S. application Ser. No. 17/030,354 and U.S. application Ser. No. 17/133,345, which are hereby incorporated by reference as though fully set forth herein. In that system, a more robust perception adaptation architecture was demonstrated. While incredibly robust, improvements in automated processes are always desirable.

Thus, a continuing need exists for an improved automated axiom generation approach along with a process for incremental updates.

SUMMARY OF INVENTION

Aspects of the present invention relates to a system for object detection and recognition and, more specifically, to a system that operates to evaluate and correct perception errors in object detection and recognition. The system comprises one or more processors and a memory having instructions such that when the instructions are executed, the one or more processors perform multiple operations. The system receives, with a perception module, perception data from an environment proximate a mobile platform, the perception data reflecting one or more objects in the environment. A plurality of perception probes is generated from the perception data, wherein the plurality of perception probes describe perception characteristics of one or more object detections in the set of perception data. For each perception probe, probabilistic distributions for true positive values and false positive values are determined, resulting in true positive perception probes and false negative perception probes. Statistical characteristics of true positive perception probes and false positive perception probes are determined. Based on the statistical characteristics, true positive perception probes are clustered. An axiom is generated to determine statistical constraints for perception validity for each perception probe cluster. The axiom is evaluated to classify the plurality of perception probes as valid or erroneous. Optimal perception parameters are generated by solving an optimization problem based on the axiom. The perception module is adjusted based on the optimal perception parameters.

In another aspect, the plurality of perception probes are combined into a multivariate random vector for determining the statistical characteristics of the plurality of perception probes.

In another aspect, the statistical characteristics comprise a mean vector, a covariance matrix, and a correlation matrix.

In another aspect, continuous incremental updates to the statistical constraints are performed as additional true positive and false positive data is received.

In another aspect, adjusting the perception module comprises causing a camera to initiate a physical action selected from a group consisting of changing a directional focus or altering a field-of-view.

Finally, aspects of the present invention also include a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of aspects of the present invention will be apparent from the following detailed descriptions of the various aspects of the invention in conjunction with reference to the following drawings, where:

FIG. 7A is a table illustrating statistic characteristics of a "person" detection according to some aspects of the present disclosure;

FIG. 7B is an illustration of a TP/FP graph for a confidence characteristic of a "person" detection according to some aspects of the present disclosure;

FIG. 7C is an illustration of a TP/FP graph for an aspect ratio characteristic of a "person" detection according to some aspects of the present disclosure;

FIG. 7D is an illustration of a TP/FP graph for a contrast characteristic of a "person" detection according to some aspects of the present disclosure;

FIG. 7E is an illustration of a TP/FP graph for an entropy characteristic of a "person" detection according to some aspects of the present disclosure;

FIG. 8A is a table illustrating statistic characteristics of a "vehicle" detection according to some aspects of the present disclosure;

FIG. 9A is a table illustrating statistic characteristics of a "bike" detection according to some aspects of the present disclosure;

DETAILED DESCRIPTION

Figure 1:
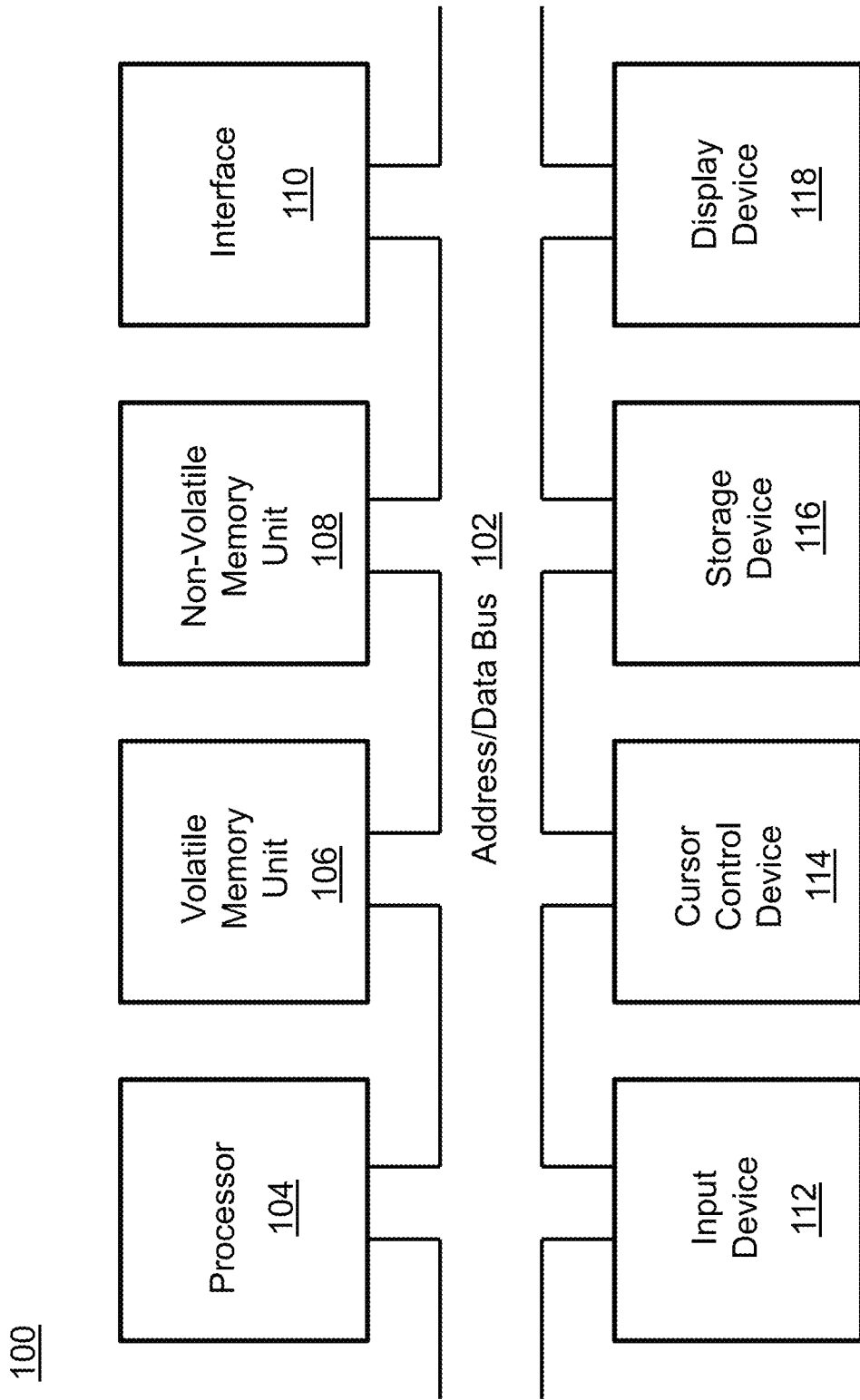
FIG. 1 is a block diagram depicting the components of a system for object detection and recognition according to some aspects of the present disclosure.

Aspects of the present invention relates to a system for object detection and recognition and, more specifically, to a system that operates to evaluate and correct perception errors in object detection and recognition. The following description is presented to enable one of ordinary skill in the art to make and use of aspects of the invention and to incorporate it in the context of particular applications. Various modifications, as well as a variety of uses in different applications will be readily apparent to those skilled in the art, and the general principles defined herein may be applied to a wide range of aspects. Thus, aspects of the present invention is not intended to be limited to the aspects presented but is to be accorded the widest scope consistent with the principles and novel features disclosed herein.

In the following detailed description, numerous specific details are set forth in order to provide a more thorough understanding of aspects of the present invention. However, it will be apparent to one skilled in the art that aspects of the present invention may be practiced without necessarily being limited to these specific details. In other instances, well-known structures and devices are shown in block diagram form, rather than in detail, in order to avoid obscuring aspects of the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of incorporated literature references is provided. Next, a description of the various principal aspects of the present invention is provided. Finally, specific details of various aspects of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Dokhanchi, H. B. Amor, J. V. Deshmukh, and G. Fainekos, "Evaluating Perception Systems for Autonomous Vehicles Using Quality Temporal Logic," International Conference on Runtime Verification, 2018.

2. R. R. da Silva, V. Kurtz, and M. Hebert, "Active Perception and Control from Temporal Logic Specifications," arXiv:1905.03662, 2019.
3. S. Jha, V. Raman, D. Sadigh, and S. A. Seshia, "Safe Autonomy Under Perception Uncertainty Using Chance-Constrained Temporal Logic," Journal of Automated Reasoning, 2018.
4. D. Sadigh and A. Kapoor, "Safe Control Under Uncertainty with Probabilistic Signal Temporal Logic," in Proc. Of Robotics: Science and Systems, 2016.
5. J. Redmon and A. Farhadi, "YOLOv3: An Incremental Improvement," arXiv:1804.02767, 2018.
6. "Bhattacharyya Distance," encyclopediaofmath.org/wiki/Bhattacharyya_distance. Taken on May 24, 2021.
7. "Mahanlanobis Distance: Simple Definition, Examples," statisticshowto.com/mahalanobis-distance. Taken on May 24, 2021.
8. "Welcome to MOTChallenge: The Multiple Object Tracking Benchmark!", motchallenge.net. Taken on May 24, 2021.

(2) PRINCIPAL ASPECTS

Various presentations of the present invention include three "principal" aspects. The first is a system for object detection and recognition. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of aspects of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
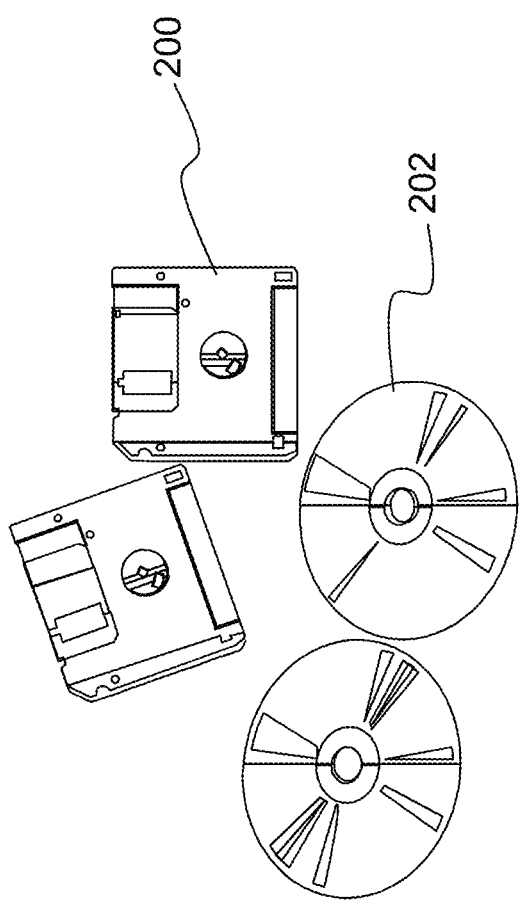
FIG. 2 is an illustration of a computer program product according to some aspects of the present disclosure.

An illustrative diagram of a computer program product (i.e., storage device) is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer and may represent pieces of a whole program or individual, separable, software modules. Non-limiting examples of "instruction" include computer program code (source or object code) and "hard-coded" electronics (i.e., computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS ASPECTS OF THE PRESENT INVENTION

Described is a method to automatically generate the statistical constraints for perception characteristics. These statistical constraints are used to classify whether the perception results are valid or erroneous. While statistical characteristics of valid detections can be determined manually, it becomes infeasible and ineffective to do so as the number of features increases and as valid detections undergo distributional shift. Using the true positive and false positive information of multiple perception features, the system described herein provides (1) the statistical boundaries of valid perception results; and (2) correlations among the multiple perception features. This aspect of the present invention also adds ability to perform continuous incremental updates. Through this process, the perception system can achieve more dynamically adaptive perception correction. Specifically, valid axioms are automatically generated to support the perception adaptation system.

(3.1) Overview

Figure 3:
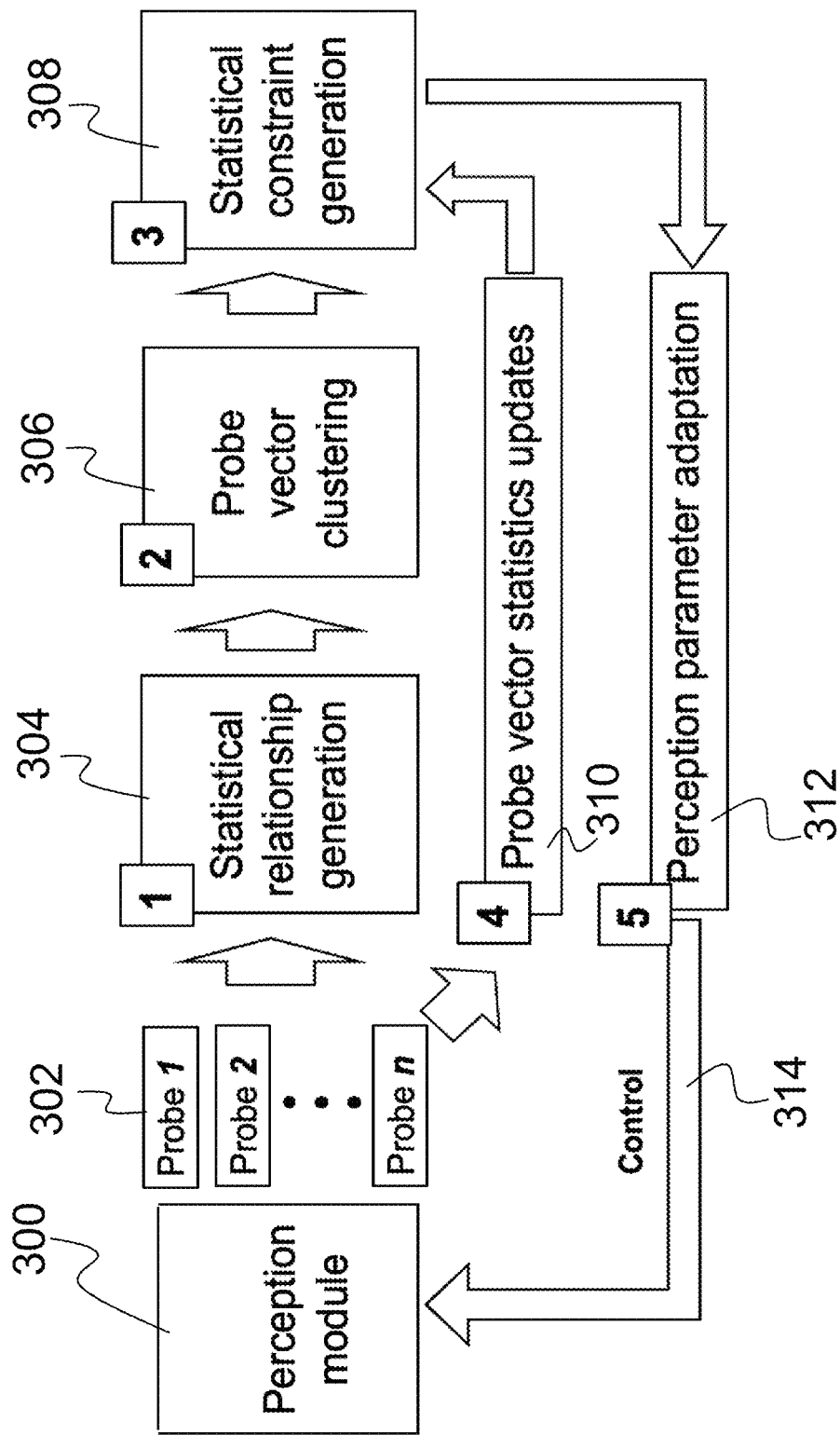
FIG. 3 is an overview illustrating the system for object detection and recognition according to some aspects of the present disclosure.

The overall structure of the present invention is shown in FIG. 3. First, from perception data (e.g., images, videos (image sequences)) from the perception module 300 (e.g., cameras), probes 302 are generated, which describe characteristics of object detections and recognitions, such as the size, type, tracking deviations, contrast, and entropy. A probe is a perception output that describe the characteristics (size, color, type, etc.) of detected objects. The probes 302 are any outputs of sensor systems and are used for signal temporal logic. Using the probes 302, in Step 1 304, the statistical relationship for all probes 302, including mean and covariance matrices of true positive and false positive probes, is determined. Then, in Step 2 306, only true positive probes are clustered based on the correlation coefficients. Once clustered, in Step 3 308, the statistical constraints for perception validity for each probe cluster are set up. If the system has already been trained, and new information is added, the constraints (i.e., probe vector statistics) are also incrementally updated in Step 4 310. And finally, through Step 5 312, the perception parameters are adapted to control 314 the perception module 300. Perception parameters are parameters that control the perception module 300 to acquire better detection or recognition. The details of Step 5 312 using the probabilistic temporal logic are presented in detail in U.S. application Ser. No. 17/030,354 and U.S. application Ser. No. 17/133,345, which are incorporated by reference herein, and also summarized below.

In operation, the system uses the perception module 300 (or modules) to generate perception data. The system ultimately evaluates the perception data to identify errors and optimizes the parameters of the perception module 300 to minimize perception error. The perception data is, for example, visual feature(s) received by a camera. As a non-limiting example, the perception module 300 can be a camera outfitted on an autonomous vehicle. Thus, in this non-limiting example, a camera sensor would be mounted on a car or vehicle. When a person or another vehicle is detected, those visual features of the other person or car would be the perception data. The perception data (e.g., camera feed) is then processed, which leads to control signals 314 being sent to the perception module to reduce perception errors. For example, the brightness or field-of-view settings may be adjusted to modify the incoming perception data. As can be appreciated by one skilled in the art, other implementations are also possible. Further details are provided below.

(3.2) Perception Probes Generation and Error Evaluation (300 and 302 in FIG. 3)

As described in detail in U.S. application Ser. No. 17/030,354 and U.S. application Ser. No. 17/133,345, the first step in the process is to obtain the perception data along with characteristics of detections and recognitions. To get different types of characteristics efficiently, a state-of-the-art detection/recognition technique is used (e.g., YOLO v3 (see Literature Reference No. 5). The following are the sample probes used in the invention described herein; however, this is not a complete list of possible probes that can be utilized.

Object size (in the image plane and in the world coordinate frame)
Aspect ratio of the detected objects
Localization and tracking performance
Recognition confidence
Contrast of the detected boxes
Entropy of the detected boxes In the system according to aspects of the present disclosure, there are multiple probes, such as detected object sizes, aspect ratios, recognition ID consistency, tracking deviations, and so on. From the true positive detections or recognitions, one can perform statistical analysis for each probe.

Object detection constraints are set up using various different types of constraints: (1) Detection ID consistency (tracking of the same object); (2) Localization consistency within the expected trajectory; (3) Bounding box size consistency in the image plane; (4) Contrast matching in the desired range; and (5) Entropy matching in a desired range. Details for each constraint are presented below, where $t_k$ is the current time and $t_{k-M}$ is the time that the temporal logic window starts.

Consistent detection is determined as follows:

$$Pr\left(\sum_{t_k-t_{k-M}}^{t_k} \det_{ID=X}\right) > P_X$$

where $P_X$ is the probabilistic threshold for consistent ID detections. If the probability of detecting ID=X is low (which means the IDs are not consistent), the tracking results are disregarded due to lack of trust in consistency.

Localization deviation from the desired tracking trajectory is determined as follows:

$$Pr(|\text{Path}_{Desired}-loc_t|_{t=t_k-t_{k-M}}^{t_k}) < P_{loc},$$

where $loc_t$ is the detected object's location at time t and $\text{Path}_{Desired}$ is its expected path from the history. As can be appreciated, there are many techniques to computer an expected path, such as curve fitting, etc. Further, $P_{loc}$ is the probabilistic threshold for consistent localization.

Bounding box size deviation over time is determined as follows:

$$Pr(|BB_D-BB_t|_{t=t_k-t_{k-M}}^{t_k}) < P_{BB}$$

where $BB_t$ is the bounding box size (e.g., number of pixels in an image) at time t and $BB_D$ is the desired bounding box size from its history. $P_{BB}$ is the probabilistic threshold for consistent bounding box size.

Contrast is determined as follows:

$$Pr(|C_t-C_D|_{t=t_k-t_{k-M}}^{t_k}) < P_C$$

where $C_t$ is the contrast (defined using the Michelson contrast, described above) of the bounding box at time t and $C_D$ is the desired contrast from the training phase. The training phase is the statistical analysis to determine all the constant values (thresholds). $P_C$ is the probabilistic threshold for contrast.

Entropy is determined as follows:

$$Pr(|E_t-E_D|_{t=t_k-t_{k-M}}^{t_k}) < P_E$$

where $E_t$ is the image entropy of the bounding box at time t and $E_D$ is the desired entropy from the training phase. $P_E$ is the probabilistic threshold for entropy.

Figure 4:
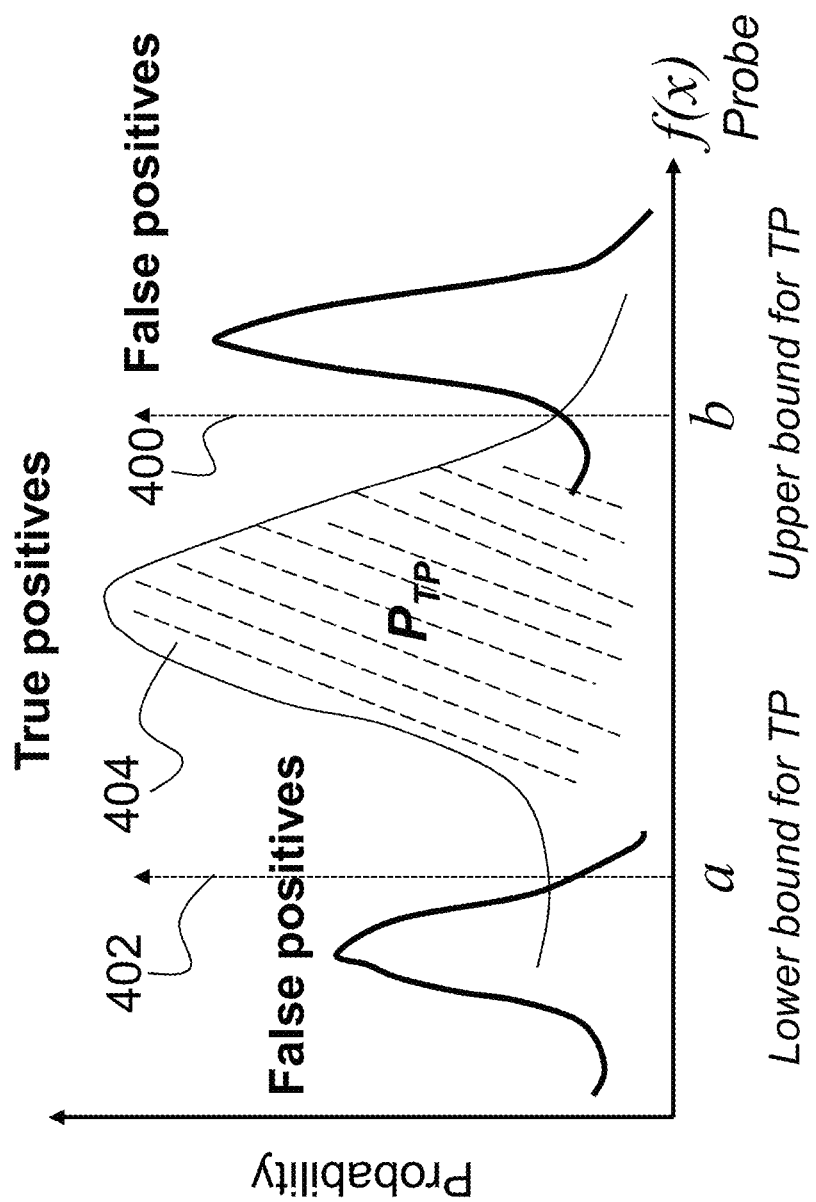
FIG. 4 is an illustration of probability distribution of a probe according to some aspects of the present disclosure.

FIG. 4 illustrates a descriptive example of a probe. For a detection/recognition, x, assume a probe, f(x) is generated. By analyzing the true positive and false positive input probes, one can obtain probabilistic distributions of true positives and false positives, as shown FIG. 4. From the intersections between two different distribution graphs (i.e., true positive and false positive graphs), one can set the upper bound 400 and the lower bound 402 for true positives (TP). The area shaded with dashed lines 404 presents the confidence probability, $P_{TP}$, of the probe. If the relation of TP and FP is described in a mathematical form (axiom) with the probabilistic signal temporal logic, it becomes as follows:

$$\forall x, Pr(a \leq f(x, t_s:t_e) \leq b \rightarrow y) \geq P_{TP}, \quad (1)$$

where a denotes the lower bound for TP, b denotes the upper bound for TP, Pr(·) is the predicate, ∀x means for every detection/recognition x, and y is the true detection or recognition. In addition, $t_s:t_e$ means the time sequence between $t_s$ (denotes start time) and $t_e$ (denotes end time), so $f(x, t_s:t_e)$ is the probe sequence in the time frame of $t_s:t_e$.

Depending on the probe dimensions, the probabilistic function can also be multi-dimensional. For example, if three probes are used together, the dimension is three. By integrating all the available axioms from x, there can be a "multi-dimensional range" of the corresponding detection or recognition. For instance, if axioms are generated for three different probes, there are three available axioms. When the probabilistic signal temporal logic (PSTL) is violated with more than a certain threshold (i.e., it does not satisfy equation (1)), one can verify that the corresponding perception process is considered as an erroneous process. Non-limiting examples of such threshold parameters include, the size of the aspect ratio of the object beyond a predefined probabilistic range, the ground object is above the surface more than a given allowance, and so on.

PSTL is defined as rules and symbolism of representing reasoning in terms of time along with real-valued signal inputs and considering probabilistic occurrences. Detecting perception errors is not sufficient to recover the perception quality in the following image sequences. Therefore, the perception modules 300 should be adjusted so that there are more accurate and robust detections and recognitions with that knowledge.

To set up the optimization problem, 'perception dynamics,' are constructed as follows:

$$x_t = f_t(x_t) + g_t(u_t), \quad (2)$$

where $x_t$ is the probe state at time t and $x_{t'}$ is the predicted probe in the next time frame, t'. $f_t(\cdot)$ is the state transition function and $g_t(\cdot)$ is the input function with the control input, $u_t$. In one aspect, control input, $u_t$ is ultimately what is adjusted on the intake device (e.g., such as altering a field of view of a camera, altering a direction of the camera (i.e., changing a direction focus)). A goal is to achieve the optimal $u_t$ to reduce perception errors (e.g., by adjusting the intake device or perception module 300). In aspects of the present invention, a unique optimization technique using the probabilistic signal temporal logic (PSTL) constraint-based optimization is presented with the following format:

$$u_{OPT} = \arg\min_{u_t} J(x_t, u_t), \quad (3)$$

J(·) is the cost function of estimating perception errors. The goal is to achieve the optimal $u_t$ to reduce perception errors. Therefore, minimizing J(·) can achieve the optimal perception module 300 control input 314. Eventually, the final optimization formula with the two or more PSTL-based constraints for probes, f ($x_t$), g ($z_t$), etc. becomes, $$u_{OPT} = \arg\min_{u_t} J(x_t, z_t, u_t) \quad (4)$$

s.t. $\forall x_t, Pr(a \leq f(x_t, t_s:t_e) \leq b \rightarrow y) \geq P_{TPx}$ $\forall z_t, Pr(g(z_t, t_s:t_e) \leq c \rightarrow w) \geq P_{TPz}$ where w denotes correct labeling for state z, y denotes correct labeling for state x, and $z_t$ denotes another signal state at time t, and c denotes the upper threshold for the distribution g(z).

(3.3) Automated Axiom Generation (308 in FIG. 3)

Figure 5:
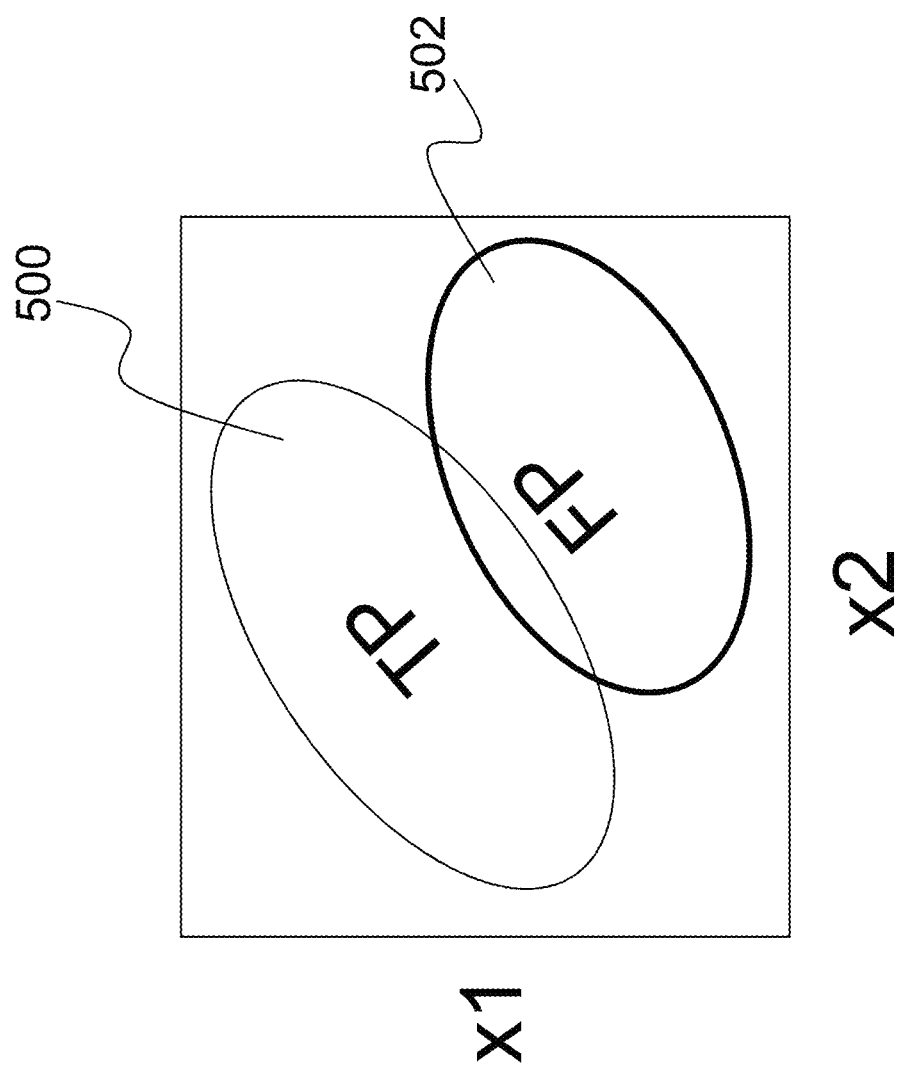
FIG. 5 is an illustration of true positive (TP)/false positive (FP) distributions of a multivariate probe vector according to some aspects of the present disclosure.

To analyze the statistical characteristics of multiple probes, first, put all probes into one vector (i.e., augmentation from 302 to 304 in FIG. 3) and deal as a multivariate random vector rather than handling individual probes separately. From that multivariate probe vector, acquire the following inter-variable and intra-variable evaluation values: (1) mean vector; (2) covariance matrix; and (3) correlation matrix, each for true positive (TP) values and false positive (FP) values. Then, there are two overlapping multi-dimensional distributions of mean vector, covariance matrix, and correlation matrix values, TP 500 and FP 502, as depicted in FIG. 5, where x1 and x2 are probes. As a non-limiting example, x1 can represent "aspect ratio", and x2 can represent "bounding box size".

With the corresponding statistical components (mean vector, covariance matrix, correlation matrix), perform (1) intra-variable evaluation; and (2) inter-variable evaluation. The intra-variable evaluation provides correlation among the probes in the true positive or false positive multivariate probe vector. Additionally, the inter-variable evaluation computes if the corresponding probe has sufficient separation between the true positive 500 and false positive 502 distributions.

First, for the intra-variable evaluation, estimate the correlation matrix R where the correlation coefficient $r_{i,j}$ between the $i^{th}$ and the $j^{th}$ factor (components of the correlation matrix) shows whether those two factors should be clustered or separated. From experimental assessments, if there is the threshold value $r_{Th}$, then $r_{i,j} > r_{Th}$ is the condition based on which the factors are clustered together. The threshold value is determined while maximizing the separation between TP and FP distributions. Probes are clustered if even one of the correlation factors (components of the correlation matrix) satisfies the condition. The purpose of clustering the probes is the find the separation between TP and FP distributions.

Then, for the inter-variable evaluation, for each probe factor $\vec{x}$, obtain the Bhattacharyya distance between the TP and FP distributions (see Literature Reference No. 6). The Bhattacharyya distance measures the similarity of two probability distributions. If the TP has mean and covariance, $(\mu_{TP}, \Sigma_{TP})$ and the FP has mean and covariance, $(\mu_{FP}, \Sigma_{FP})$, then the Bhattacharyya distance is:

$$D_B(\vec{x}) = \frac{1}{8}(\mu_{TP} - \mu_{FP})^T \left(\frac{\Sigma_{TP} + \Sigma_{FP}}{2}\right)^{-1} (\mu_{TP} - \mu_{FP}) + \frac{1}{2}\ln\left(\frac{\left|\frac{\Sigma_{TP} + \Sigma_{FP}}{2}\right|}{\sqrt{|\Sigma_{TP}||\Sigma_{FP}|}}\right) \quad (5)$$

The threshold $D_{Th}$ is experimentally acquired to evaluate if a given probe factor has sufficient TP/FP separation. If $D_B(\vec{x}) > D_{TH}$, then $\vec{x}$ is meaningful to validate the perception results. For the verified probe cluster using the intra-variable evaluation and the inter-variable evaluation, when there is a new sample, $\vec{x}$, the Mahalanobis distances from the TP and FP distributions (see Literature Reference No. 7) is obtained as follows:

$$D_{TP/FP}(\vec{x}) = \sqrt{(\vec{x} - \vec{\mu}_{TP/FP})^T (\Sigma_{TP/FP})^{-1} (\vec{x} - \vec{\mu}_{TP/FP})}. \quad (6)$$

From this information, two statistical characteristics are tested: (1) statistical closeness to TP; and (2) statistical separation between TP and FP. For the statistical closeness to TP, the cumulative distribution function value for $\vec{x}$, $CDF(\vec{x})$ should be larger than a certain threshold, $Prob_{TH}$, $CDF(\vec{x}) > Prob_{TH}$.

Then, for the statistical separation between TP and FP, the probe vector is classified as a true positive detection if $$\frac{D_{TP}(\vec{x})}{D_{FP}(\vec{x})} > Ratio_{TH}. \quad (7)$$

Otherwise, it is classified as a false positive. $Ratio_{TH}$ is the TP/FP distance ratio obtained experimentally.

Even after completing the training process, one may receive additional annotated true positive and false positive data to further improve the statistical characteristics. In conventional methods, there is retraining from the beginning, but in this architecture, one can incrementally update the characteristics (i.e., probe vector characteristics) instead (Step 4 310 in FIG. 3). If there are n probe vectors to train the TP distribution, and another m probe vectors with TP classifications, then the mean and the covariance will be updated using the following equations.

$$\vec{\mu}_{Updated} = \frac{n}{n+m}\vec{\mu}_{Current} + \frac{m}{n+m}\vec{\mu}_{Additional} \quad (8)$$

$$\overrightarrow{\sum}_{Updated} = \frac{n}{n+m}\overrightarrow{\sum}_{Current} + \frac{m}{n+m}\overrightarrow{\sum}_{Additional} \quad (9)$$

The same process is performed to the FP distribution. Since the correlations are not re-checked during this process, the probe vector clustering will not be modified.

Finally, the axiom can be generated to validate the results from the perception modules 300. With the probabilistic signal temporal logic framework described above, there is the following axiom:

$$Pr_{(\vec{\mu}_{TP}, \Sigma_{TP})}\{|\vec{x} - \vec{\mu}_{TP}|_{[t-n,t]} < Bound_{TH}\} > Prob_{TH}, \quad (10)$$

where n is the number of image frames before the current frame that the perception error detection system looks at and $Bound_{TH}$ is the bound threshold to satisfy the Mahalonobis distance for $\vec{x}$, and $Prob_{TH}$ is the probability threshold to make the left side of the equation true positive.

(3.4) Experimental Studies

Figure 6:
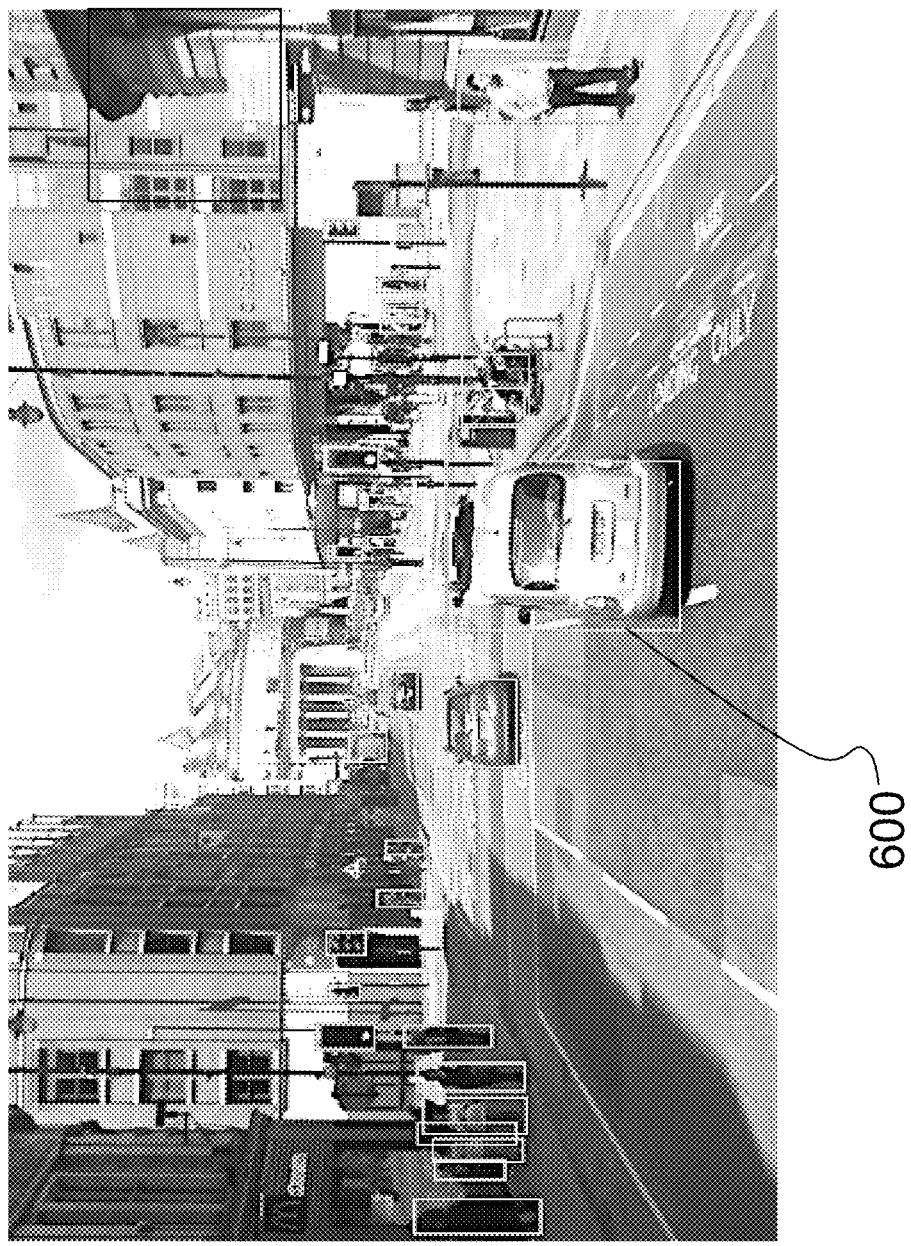
FIG. 6 is an illustration of a sample screenshot of a Ministry of Transport (MOT) street scene according to some aspects of the present disclosure.

A simple test on one of Multiple Object Tracking Benchmark datasets (see Literature Reference No. 8) was performed. In the scene depicted in FIG. 6, there are a number of person, vehicle, and bike detections, as indicated by white rectangular outlines (e.g., 600). The statistical characteristics of these three object types with 'recognition confidence, "aspect ratio,' 'contrast' and 'entropy' probes are described below.

Figure 8B:
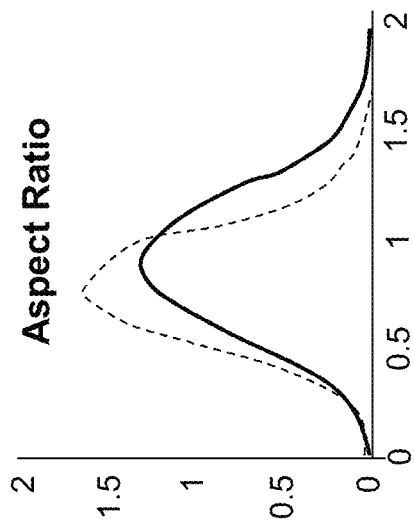
FIG. 8B is an illustration of a TP/FP graph for a confidence characteristic of a "vehicle" detection according to some aspects of the present disclosure.
Figure 8C:
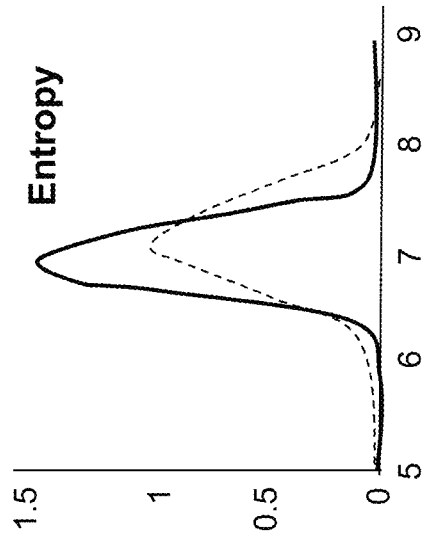
FIG. 8C is an illustration of a TP/FP graph for an aspect ratio characteristic of a "vehicle" detection according to some aspects of the present disclosure.
Figure 8D:
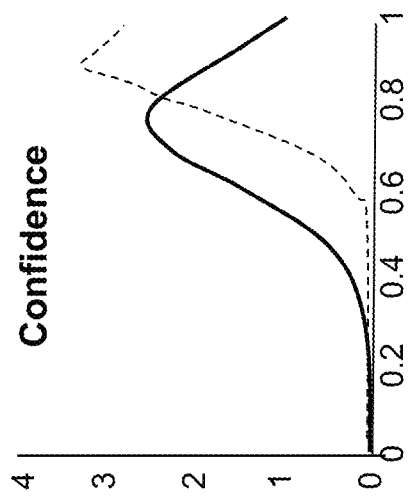
FIG. 8D is an illustration of a TP/FP graph for a contrast characteristic of a "vehicle" detection according to some aspects of the present disclosure.
Figure 8E:
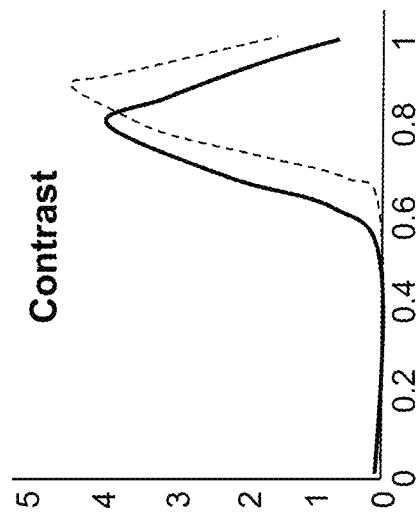
FIG. 8E is an illustration of a TP/FP graph for an entropy characteristic of a "vehicle" detection according to some aspects of the present disclosure.
Figure 9B:
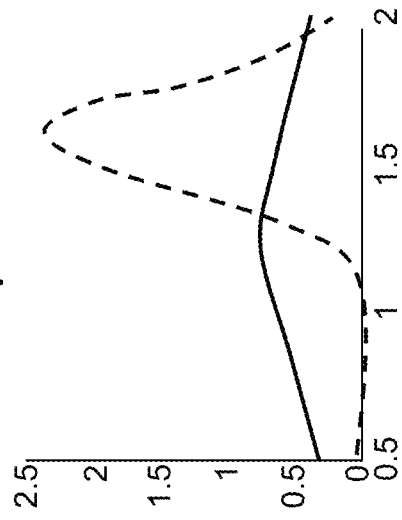
FIG. 9B is an illustration of a TP/FP graph for a confidence characteristic of a "bike" detection according to some aspects of the present disclosure.
Figure 9C:
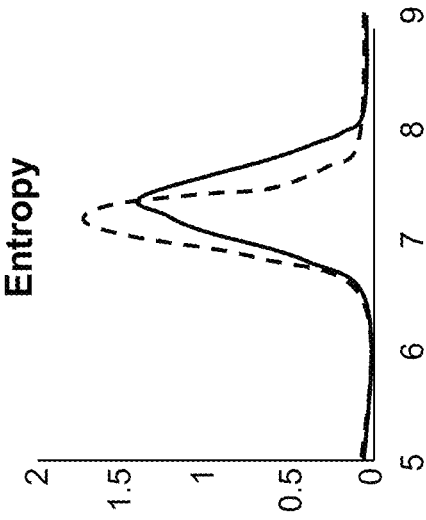
FIG. 9C is an illustration of a TP/FP graph for an aspect ratio characteristic of a "bike" detection according to some aspects of the present disclosure.
Figure 9D:
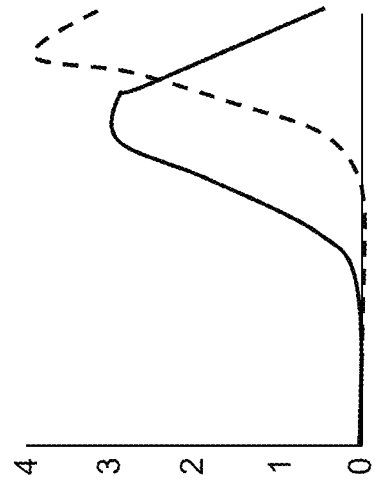
FIG. 9D is an illustration of a TP/FP graph for a contrast characteristic of a "bike" detection according to some aspects of the present disclosure.

First, for 'Person' detections, there are the characteristics for true positive and false positive probes shown in FIGS. 7A-7E. With the experimental correlation threshold set to '0.3', only the contrast and entropy are correlated among all the probes as per the correlation coefficients (e.g., 1.000) presented in the table in FIG. 7A. For each of the tables (FIG. 7A, FIG. 8A, and FIG. 9A), a higher value (in absolute values) indicates the corresponding probes are highly correlated. From the TP/FP graphs in FIGS. 7B-7E, besides the aspect ratio (FIG. 7C), where TP and FP areas are almost identical, the rest have separations between TP (dashed curves 700) and FP (solid curves 702) distributions. Thus, in 'Person' detection, there are two clusters: (1) {Confidence}; and (2) {Contrast, Entropy}.

For 'Vehicle' detections, there are the characteristics for true positive and false positive probes shown in FIGS. 8A-8E. With the same correlation threshold '0.3', only the contrast and entropy are correlated among all the probes as per the correlation coefficients presented in the table in FIG.

8A. However, from the TP/FP graphs, in addition to the aspect ratio (FIG. 8C), the entropy (FIG. 8E) does not show sufficient separation either. Thus, in 'Vehicle' detection, there are two separate probes/clusters: (1) {Confidence}; and (2) {Contrast}.

Figure 9E:
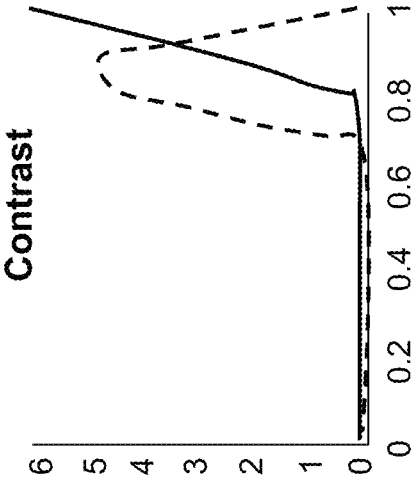
FIG. 9E is an illustration of a TP/FP graph for an entropy characteristic of a "bike" detection according to some aspects of the present disclosure.

For 'Bike' detections, there are the characteristics for true positive and false positive probes shown in FIGS. 9A-9D. With the same correlation threshold, '0.3', all the probes are correlated from the correlation coefficients presented in the table in FIG. 9A. However, from the TP/FP graphs, the aspect ratio (FIG. 9C) and entropy (FIG. 9E) cannot be used because they do not show sufficient separation. Thus, in 'Bike' detection, there is one cluster: {Confidence, Contrast}.

The unique advantages of aspects of the present invention include the following. Statistical boundaries of valid perception results automatically are provided using each probe's true positive and false positive distributions. The perception features are automatically categorized using statistical correlations. The system described herein automatically and incrementally updates the statistical boundaries of the perception validities. Finally, aspects of the present invention automatically generates the valid perception axioms.

(3.5) Control of a Device

Figure 10:
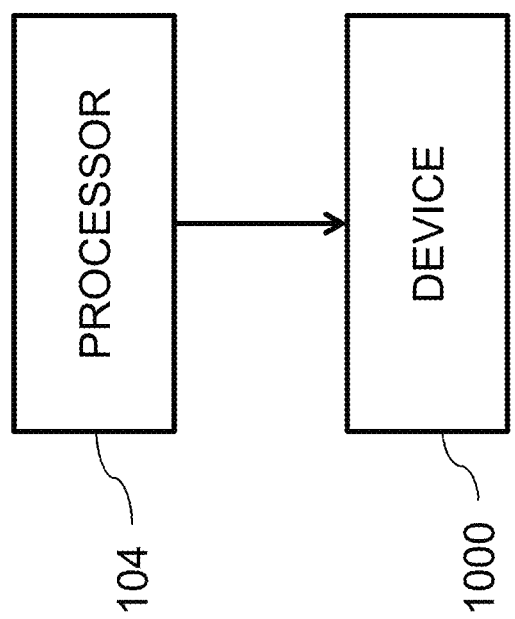
FIG. 10 is a block diagram depicting control of a device according to various aspects.

As shown in FIG. 10, a processor 104 may be used to control a device 1000 (e.g., a perception module 300 that captures perception data) based on solving the optimization problem. The control of the device 1000 may be used to modify the parameters that are used in controlling a perception module 300. In other embodiments, the device 1000 may be controlled to cause the perception module 300 device to move or otherwise initiate a physical action, such as changing directions or field-of-view. For example, actuators or motors are activated to cause the camera (or sensor) to move or zoom in or change a field-of-view.

Aspects of the present invention described herein supports computer vision and machine learning. For instance, in the field of vehicle manufacturing, lack of labeled data is a big bottleneck for data-driven approaches. With the PTSL object recognition system described herein, which uses only a few labels, classification is performed much quicker and more accurately. Furthermore, object detection and recognition process can facilitate autonomous cars with human instructions (e.g., construction worker, traffic officer). Based on the classification of the object, such as a pedestrian or stop sign, etc., the system described herein causes a vehicle/driving maneuver to be performed by the autonomous vehicle that corresponds to the class label identified by the system. For example, if the object is a construction worker or traffic officer holding up a hand to indicate "stop", the system can cause the autonomous vehicle to apply a functional response, such as a braking operation implemented by a braking mechanism within the vehicle, in order to bring the autonomous vehicle to a stop. Likewise, if the system recognizes a pedestrian running or walking in front of the vehicle, the system can cause the vehicle to stop to avoid hitting the pedestrian. Other appropriate vehicle maneuver responses may include one or more of a steering operation, a throttle operation to increase speed or to decrease speed, or a decision to maintain course and speed without change. The vehicle responses may be appropriate for avoiding a collision or altering travel speed. In one embodiment, if the system detects an object in its path (e.g., a pedestrian, another vehicle), an alert is sent to the vehicle operating system to cause the vehicle to perform a braking operation. Alternatively, the alert may signal that the vehicle operating system should perform a swerving motion around the object, involving steering and accelerating operations or any other operations as required to provide for collision avoidance. As can be appreciated by those skilled in the art, other applications may also be applicable, such as those described in U.S. Provisional Application No. 62/984,713, filed on Mar. 3, 2020, the entirety of which is incorporated herein by reference as though fully set forth herein. Additionally, aspects of the invention described herein can be applied to detection and recognition of other objects, including, but not limited to, road or storefront signs, buildings, animals (e.g., pets, on or off leash, which are proximate an autonomous vehicle), and other types of vehicles (e.g., scooters, mopeds, motorcycles, skateboards, trucks). In further aspects, the alerts may be sent and displayed on a display device for the user of the system and may in some aspects ask the user to react to the alert and control the system; rather than utilizing the automatic control.

Furthermore, in addition to applications in autonomous driving, aspects of the present invention can be implemented in, but not limited to, autonomous robot operations, moving equipment, manufacturing quality control, and continuous correct process confirmation. Aspects of the present invention described herein can also be utilized in aiding in refinement of other visual images or decisions, such as medical diagnostic imaging or pattern recognition (e.g., topography).

In summary, aspects of the present invention described herein estimates and corrects perception errors with formal verification. The system according to aspects of the present disclosure provides an automated process for generating the corresponding axioms/constraints and performing incremental updates. With these unique features, aspects of the present invention can be used in more robust autonomous driving systems, in autonomous unmanned systems, and also in more reliable intelligence, surveillance, and reconnaissance (ISR) missions.

Finally, while aspects of this present invention has been described in terms of several embodiments, one of ordinary skill in the art will readily recognize that aspects of the present invention may have other applications in other environments. It should be noted that many embodiments and implementations are possible. Further, the following claims are in no way intended to limit the scope of aspects of the present invention to the specific aspects described above. In addition, any recitation of "means for" is intended to evoke a means-plus-function reading of an element and a claim, whereas any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of aspects of the present invention.

What is claimed is:

1. A system to evaluate and correct perception errors in object detection and recognition, the system comprising:
   one or more processors and a non-transitory computer-readable medium having executable instructions encoded thereon such that when executed, the one or more processors perform operations of:
   receiving, with a perception module, perception data from an environment proximate a mobile platform, the perception data reflecting one or more objects in the environment;
   generating a plurality of perception probes from the perception data, wherein the plurality of perception probes describe perception characteristics of one or more object detections in the set of perception data;

for each perception probe, determining probabilistic distributions for true positive values and false positive values, resulting in true positive perception probes and false negative perception probes;

determining statistical characteristics of true positive perception probes and false positive perception probes;

based on the statistical characteristics, clustering true positive perception probes;

generating an axiom to determine statistical constraints for perception validity for each perception probe cluster;

evaluating the axiom to classify the plurality of perception probes as valid or erroneous;

generating optimal perception parameters by solving an optimization problem based on the axiom; and adjusting the perception module based on the optimal perception parameters.

2. The system as set forth in claim 1, wherein the plurality of perception probes are combined into a multivariate random vector for determining the statistical characteristics of the plurality of perception probes.

3. The system as set forth in claim 1, wherein the statistical characteristics comprise a mean vector, a covariance matrix, and a correlation matrix.

4. The system as set forth in claim 1, wherein the one or more processors perform continuous incremental updates to the statistical constraints as additional true positive and false positive data is received.

5. The system as set forth in claim 1, wherein adjusting the perception module comprises causing a camera to initiate a physical action selected from a group consisting of changing a directional focus or altering a field-of-view.

6. A computer program product to evaluate and correct perception errors in object detection and recognition, the computer program product comprising:
a non-transitory computer-readable medium having executable instructions encoded thereon, such that upon execution of the instructions by one or more processors, the one or more processors perform operations of:
receiving, with a perception module, perception data from an environment proximate a mobile platform, the perception data reflecting one or more objects in the environment;

generating a plurality of perception probes from the perception data, wherein the plurality of perception probes describe perception characteristics of one or more object detections in the set of perception data;

for each perception probe, determining probabilistic distributions for true positive values and false positive values, resulting in true positive perception probes and false negative perception probes;

determining statistical characteristics of true positive perception probes and false positive perception probes;

based on the statistical characteristics, clustering true positive perception probes;

generating an axiom to determine statistical constraints for perception validity for each perception probe cluster;

evaluating the axiom to classify the plurality of perception probes as valid or erroneous;

generating optimal perception parameters by solving an optimization problem based on the axiom; and adjusting the perception module based on the optimal perception parameters.

7. The computer program product as set forth in claim 6, wherein the plurality of perception probes are combined into a multivariate random vector for determining the statistical characteristics of the plurality of perception probes.

8. The computer program product as set forth in claim 6, wherein the statistical characteristics comprise a mean vector, a covariance matrix, and a correlation matrix.

9. The computer program product as set forth in claim 6, wherein the one or more processors perform continuous incremental updates to the statistical constraints as additional true positive and false positive data is received.

10. The computer program product as set forth in claim 6, wherein adjusting the perception module comprises causing a camera to initiate a physical action selected from a group consisting of changing a directional focus or altering a field-of-view.

11. A computer implemented method to evaluate and correct perception errors in object detection and recognition, the method comprising an act of:
causing one or more processors to execute instructions encoded on a non-transitory computer-readable medium, such that upon execution, the one or more processors perform operations of:
receiving, with a perception module, perception data from an environment proximate a mobile platform, the perception data reflecting one or more objects in the environment;

generating a plurality of perception probes from the perception data, wherein the plurality of perception probes describe perception characteristics of one or more object detections in the set of perception data;

for each perception probe, determining probabilistic distributions for true positive values and false positive values, resulting in true positive perception probes and false negative perception probes;

determining statistical characteristics of true positive perception probes and false positive perception probes;

based on the statistical characteristics, clustering true positive perception probes;

generating an axiom to determine statistical constraints for perception validity for each perception probe cluster;

evaluating the axiom to classify the plurality of perception probes as valid or erroneous;

generating optimal perception parameters by solving an optimization problem based on the axiom; and adjusting the perception module based on the optimal perception parameters.

12. The method as set forth in claim 11, wherein the plurality of perception probes are combined into a multivariate random vector for determining the statistical characteristics of the plurality of perception probes.

13. The method as set forth in claim 11, wherein the statistical characteristics comprise a mean vector, a covariance matrix, and a correlation matrix.

14. The method as set forth in claim 11, wherein the one or more processors perform continuous incremental updates to the statistical constraints as additional true positive and false positive data is received.

15. The method as set forth in claim 11, wherein adjusting the perception module comprises causing a camera to initiate a physical action selected from a group consisting of changing a directional focus or altering a field-of-view.

* * * * *